(12) United States Patent
Taniguchi et al.

(10) Patent No.: US 7,982,748 B2
(45) Date of Patent: Jul. 19, 2011

(54) VEHICLE SURROUNDINGS MONITORING APPARATUS

(75) Inventors: Fuminori Taniguchi, Saitama (JP); Hiroyuki Koike, Saitama (JP); Masakazu Saka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 970 days.

(21) Appl. No.: 11/799,987

(22) Filed: May 3, 2007

(65) Prior Publication Data
US 2007/0269079 A1    Nov. 22, 2007

(30) Foreign Application Priority Data

May 19, 2006    (JP) ................... 2006-140117

(51) Int. Cl.
*G09G 5/00*    (2006.01)
(52) U.S. Cl. ........................ 345/619; 382/190
(58) Field of Classification Search .......... 345/619
See application file for complete search history.

(56) References Cited

U.S. PATENT DOCUMENTS

| 7,330,568 | B2 | 2/2008 | Nagaoka et al. | |
| 7,447,334 | B1* | 11/2008 | Jiang et al. | 382/103 |
| 2004/0183906 | A1 | 9/2004 | Nagaoka et al. | |
| 2005/0157929 | A1* | 7/2005 | Ogasawara | 382/181 |

FOREIGN PATENT DOCUMENTS

| DE | 101 48 071 A1 | 4/2003 |
| DE | 10 2004 012 811 A1 | 11/2004 |
| JP | 11-328364 | 11/1999 |
| JP | 2001-006096 | 1/2001 |
| JP | 2002-312769 | 10/2002 |
| JP | 2004-295798 | 10/2004 |

OTHER PUBLICATIONS

Rigney et al. "Investigation of Animal Detection for Traffic Accident Mitigation" Southwest Research Institution pp. 1-2 Nov. 2004.*
"Rentierlaterne Aus Alufolie" Adventkalender-2004, http://www.hscincin.musin.de/G-Mitmachen/G-1-Aktion%20des%20Monats/Adventkalender-2004/Tag-08/Rentierlaterne-Anleitung.doc.

* cited by examiner

*Primary Examiner* — Xiao M Wu
*Assistant Examiner* — Maurice McDowell, Jr.
(74) *Attorney, Agent, or Firm* — Carrier Blackman & Associates, P.C.; Joseph P. Carrier; William D. Blackman

(57) ABSTRACT

A vehicle surroundings monitoring apparatus is provided herein which is capable of determining an object type, particularly capable of determining an animal other than a human being among objects. The vehicle surroundings monitoring apparatus which monitors the surroundings of a vehicle by using an image captured by a camera (2R, 2L) mounted on the vehicle, including an object extraction process unit which extracts an image area of the object from the captured image (steps 1 to 6) and an object type determination process unit which determines the object type according to whether the image area of the object extracted by the object extraction process unit includes a first object area of an inverse triangular shape and a second object area located below the first object area and within a predetermined range from the first object area (steps 31 to 36).

16 Claims, 7 Drawing Sheets

VEHICLE SURROUNDINGS MONITORING APPARATUS

BACKGROUND OF THE INVENTION

1. Field of the Invention

The present invention relates to a vehicle surroundings monitoring apparatus which recognizes an object affecting the traveling of a subject vehicle.

2. Related Background Art

Conventionally, as this type of vehicle surroundings monitoring apparatus, there has been suggested a display processor which extracts an image area of a pedestrian likely to come in contact with a subject vehicle from an image of the surroundings of the vehicle captured by an infrared camera and visually provides the information to a driver of the vehicle (for example, refer to Japanese Patent Laid-Open No. Hei 11(1999)-328364). This apparatus binarizes the captured infrared image to find out a high-luminance area and determines the high-luminance area to be a pedestrian's head if the centroid position, area ratio, net area and the like of the high-luminance area satisfy predetermined head determination conditions. After determining the area of the pedestrian's head, it then sets an area including a pedestrian's body and displays these areas separated from other areas. Thereby, the position of the pedestrian's entire body is identified in the captured infrared image, and the information is displayed to the vehicle driver as a visual aid.

An object existing around the vehicle and likely to come in contact with the vehicle, however, is not limited to a pedestrian. For example, a large animal such as a deer may exist on a road and come in contact with the vehicle. In this situation, the large animal is not determined to be a pedestrian under the above determination conditions based on the centroid position, area ratio, net area and the like of the high-luminance area. Therefore, the apparatus has such a disadvantage that information on the large animal is not presented to the vehicle driver as information calling attention to it, though the large animal is likely to come in contact with the vehicle.

SUMMARY OF THE INVENTION

In view of the above problem, it is an object of the present invention to provide a vehicle surroundings monitoring apparatus capable of determining an object type, and particularly a vehicle surroundings monitoring apparatus capable of determining an animal other than a human being among objects.

In order to solve the above object, according to one aspect of the present invention, there is provided a vehicle surroundings monitoring apparatus which monitors the surroundings of a vehicle by using an image captured by a camera mounted on the vehicle, comprising: an object extraction process unit which extracts an image area of an object from the image captured by the camera; and an object type determination process unit which determines an object type according to whether the image area of the object extracted by the object extraction process unit includes a first object area of an inverse triangular shape and a second object area located below the first object area and within a predetermined range from the first object area.

Generally, depending on the type of animal, an image area is obtained which has a first object area of an inverse triangular shape corresponding to an animal's head and a second object area corresponding to an animal's body below the first object area in the case where the animal is captured from the front or back by a camera. Therefore, the vehicle surroundings monitoring apparatus according to the present invention determines the object type under the condition that the image area of the object includes the first object area of the inverse triangular shape and the second object area located below the first object area and within the predetermined range from the first object area. Thereby, it is possible to determine whether the object type is an animal having the image area of the inverse triangular shape.

Furthermore, in the vehicle surroundings monitoring apparatus according to the present invention, preferably the object type determination process unit determines that the object type is an animal other than a human being in the case where the image area of the object extracted by the object extraction process unit includes the first object area of the inverse triangular shape and the second object area located below the first object area and within the predetermined range from the first object area.

According to the vehicle surroundings monitoring apparatus of the present invention, the object type determination process unit determines whether the object is an animal other than a human being under the condition that the image area of the object includes the first object area of the inverse triangular shape and the second object area located below the first object area and within the predetermined range from the first object area. Thereby, it is possible to determine whether the object is an animal other than a human being, as distinguished from a signboard, sign, or the like not having the inverse triangular shape.

Furthermore, in the vehicle surroundings monitoring apparatus according to the present invention, preferably the first object area has a predetermined size.

Generally, the size of the first object area corresponding to the head depends on the type of animal. Therefore, the object type determination process unit determines the object type under the condition that the image area includes the first object area of the inverse triangular shape having the predetermined size. Thereby, the object type can be determined more accurately.

Furthermore, in the vehicle surroundings monitoring apparatus according to the present invention, preferably the object type determination process unit determines the object type based on a relationship between a first area width and a second area width, with the first area width given as the length of a side facing the apex angle located at the lowest position of the first object area of the inverse triangular shape or the maximum value of the horizontal width of the inverse triangular shape, and the second area width given as the maximum value of the horizontal width of the second object area.

Generally, the relationship between the first area width corresponding to the width of an animal's head and the second area width corresponding to an animal's body depends on the type of animal. Therefore, the object type determination process unit according to the present invention determines the object type based on the relationship between the first area width and the second area width. Thereby, it is possible to determine whether the object type is an animal satisfying the predetermined relationship between the first area width and the second area width.

Furthermore, in the vehicle surroundings monitoring apparatus according to the present invention, preferably the object type determination process unit determines that the object type is an animal other than a human being in the case where the second area width is greater than one half of the first area width.

Generally, it is thought that the width of the body supporting the head is greater than at least one half of the width of the head if the object is an animal other than a human being. Therefore, according to the vehicle surroundings monitoring apparatus of the present invention, the object can be determined to be an animal other than a human being in the case where the second area width is greater than one half of the first area width.

Furthermore, preferably the vehicle surroundings monitoring apparatus according to the present invention further comprises a distance calculation process unit which calculates a distance of a real space position corresponding to the image area included in the captured image from the vehicle, wherein the object type determination process unit determines the object type under the condition that a real space position corresponding to the second object area is located within a predetermined distance from a real space position corresponding to the first object area.

When an animal other than a human being is viewed from the front, generally the second object area corresponding to the body is located substantially just below the first object area corresponding to the head. Therefore, the real space distance of the first object area is substantially equal to that of the second object area. On the other hand, when it is viewed from the back, the second object area is not located just below the first object area, but on this side. Therefore, some difference occurs in real space distance between the first object area and the second object area. Therefore, the vehicle surroundings monitoring apparatus according to the present invention determines the object type under that condition that the real space position of the second object area is located within the predetermined distance from the real space position of the first object area. Thereby, the first object area and the second object area can be determined to be parts of the same animal in either case where the object is viewed from the front or back, whereby the object type can be determined accurately.

According to another aspect of the present invention, there is provided a vehicle surroundings monitoring apparatus which monitors the surroundings of a vehicle by using a computer which is provided in the apparatus and includes an interface circuit for use in accessing an image captured by a camera mounted on the vehicle, the computer performing: an object extraction process for extracting an image area of an object from the image captured by the camera; and an object type determination process for determining an object type according to whether the image area of the object extracted by the object extraction process includes a first object area of an inverse triangular shape and a second object area located below the first object area and within a predetermined range from the first object area.

According to the vehicle surroundings monitoring apparatus of the present invention, the computer performs the object extraction process to extract the image area of the object from the image and performs the object type determination process to determine the object type under the condition that the extracted image area includes the first object area of the inverse triangular shape and the second object area located below the first object area and within the predetermined range from the first object area. Thereby, it is possible to determine whether the object type is an animal having the image area of the inverse triangular shape.

According to still another aspect of the present invention to achieve the above object, there is provided a vehicle equipped with the vehicle surroundings monitoring apparatus.

According to the vehicle of the present invention, the vehicle surroundings monitoring apparatus determines the object type under the condition that the image area of the object includes the first object area of the inverse triangular shape and the second object area located below the first object area and within the predetermined range from the first object area. Thereby, it is possible to determine whether the object type is an animal having the image area of the inverse triangular shape.

According to still another aspect of the present invention to achieve the above object, there is provided a vehicle surroundings monitoring program which causes an in-vehicle computer including a processing unit which accesses data of an image captured by a camera mounted on a vehicle to perform a function of monitoring the surroundings of the vehicle, the program causing the computer to function as: an object extraction process unit which extracts an image area of an object from the image captured by the camera; and an object type determination process unit which determines an object type according to whether the image area of the object extracted by the object extraction process unit includes a first object area of an inverse triangular shape and a second object area located below the first object area and within a predetermined range from the first object area.

The vehicle surroundings monitoring program according to the present invention is executed on the computer to extract the object from the captured image by means of the object extraction process unit and to determine the object type under the condition that the image area of the object extracted by the object extraction process unit includes the first object area of the inverse triangular shape and the second object area located below the first object area and within the predetermined range from the first object area by means of the object type determination process unit. Thereby, it is possible to determine whether the object type is an animal having the image area of the inverse triangular shape.

According to still another aspect of the present invention to achieve the above object, there is provided a vehicle surroundings monitoring method of monitoring the surroundings of a vehicle by using an in-vehicle computer including a processing unit which accesses data of an image captured by a camera mounted on the vehicle, the method comprising: an object extraction step of causing the computer to extract the image area of an object from the image captured by the camera; and an object type determination step of causing the computer to determine an object type according to whether the image area of the object extracted in the object extraction step includes a first object area of an inverse triangular shape and a second object area located below the first object area and within a predetermined range from the first object area.

According to the vehicle surroundings monitoring method of the present invention, the computer extracts the object from the captured image in the object extraction step and determines the object type under the condition that the image area of the object extracted in the object extraction step includes the first object area of the inverse triangular shape and the second object area located below the first object area and within the predetermined range from the first object area in the object type determination step. Thereby, it is possible to determine whether the object type is an animal having the image area of the inverse triangular shape.

DETAILED DESCRIPTION OF THE PREFERRED EMBODIMENTS

One embodiment of the present invention will be described below with reference to FIG. 1 to FIG. 7.

Figure 1:
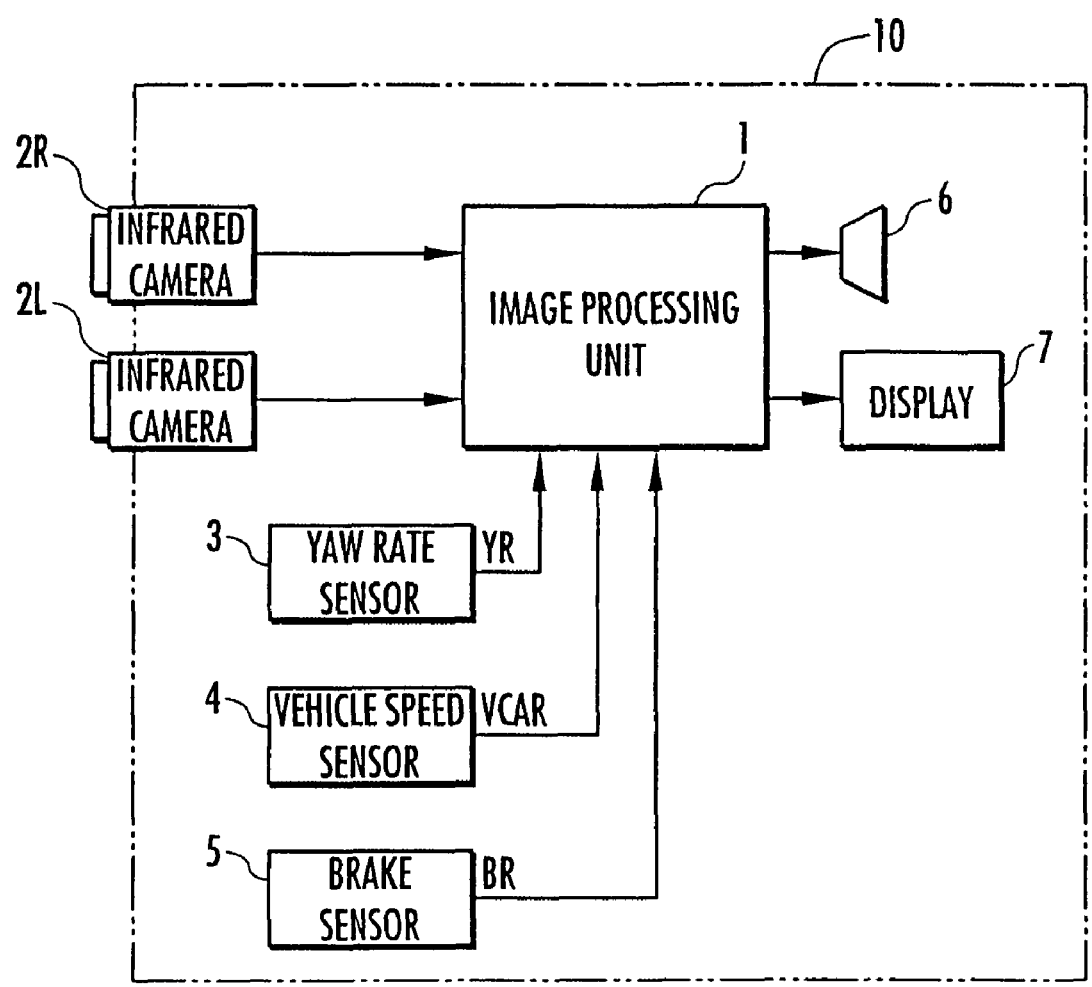
FIG. 1 is a diagram showing the overall configuration of one embodiment of a vehicle surroundings monitoring apparatus according to the present invention.
Figure 2:
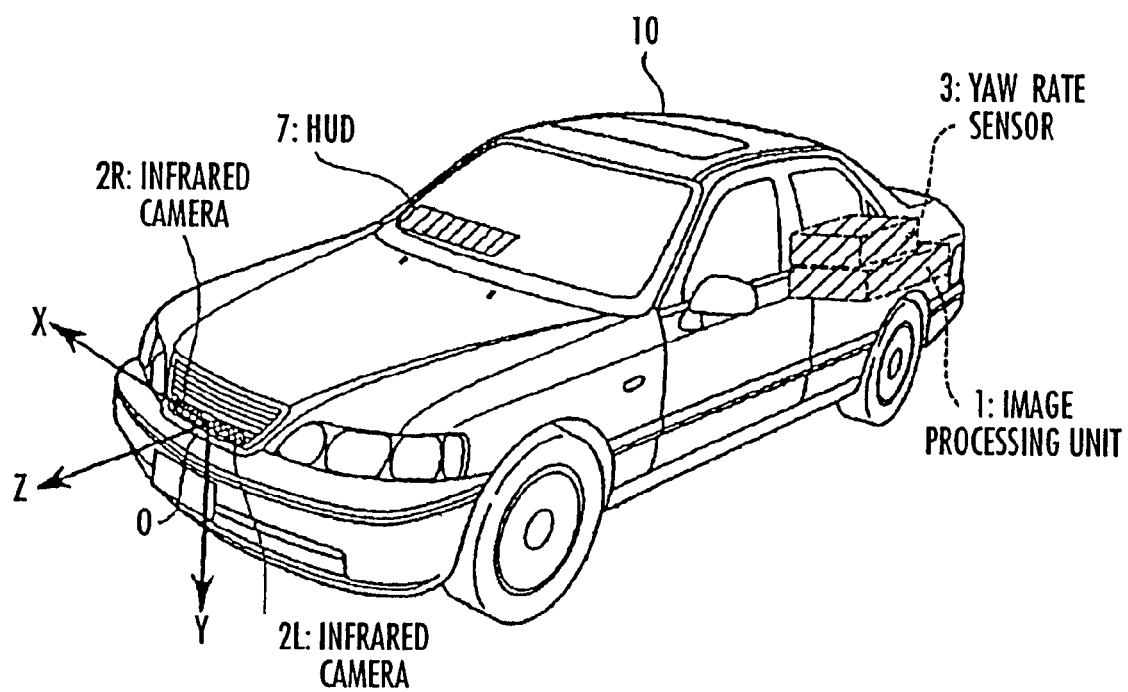
FIG. 2 is a perspective diagram of a vehicle equipped with the vehicle surroundings monitoring apparatus shown in FIG. 1.

First, the system configuration of a vehicle surroundings monitoring apparatus of this embodiment will be described with reference to FIG. 1 and FIG. 2. FIG. 1 is a block diagram showing the overall configuration of the vehicle surroundings monitoring apparatus and FIG. 2 is a perspective diagram showing the appearance of a vehicle (subject vehicle) equipped with the vehicle surroundings monitoring apparatus. In FIG. 2, partial components of the vehicle surroundings monitoring apparatus are not shown.

Referring to FIG. 1 and FIG. 2, the vehicle surroundings monitoring apparatus according to this embodiment includes an image processing unit 1. The image processing unit 1 is connected to two infrared cameras 2R and 2L which capture images in front of the vehicle 10 and is connected to a yaw rate sensor 3 which detects a yaw rate of the vehicle 10 as a sensor which detects the running condition of the vehicle 10, a vehicle speed sensor 4 which detects a traveling speed (vehicle speed) of the vehicle 10, and a brake sensor 5 which detects whether a brake of the vehicle 10 is operated. Furthermore, the image processing unit 1 is connected to a loudspeaker 6 for use in outputting audible information calling attention with voice or the like and to a display 7 for use in displaying images captured by the infrared cameras 2R and 2L and visual information calling attention. The infrared cameras 2R and 2L correspond to the cameras in the present invention.

Although detailed illustration is not shown here, the image processing unit 1 is composed of an electronic circuit including an A/D converter, a microcomputer (having a CPU, RAM, ROM and the like), and an image memory. Analog signals output from the infrared cameras 2R and 2L, the yaw rate sensor 3, the vehicle speed sensor 4, and the brake sensor 5 are converted to digital data by the A/D converter and input to the microcomputer. Thereafter, the microcomputer detects an object such as a human being (a pedestrian or a person on a bicycle) based on the input data, and if the detected object satisfies predetermined requirements for calling attention, it performs processing for calling driver's attention to the object by means of the loudspeaker 6 or the display 7. For example, the image processing unit 1 has an image input circuit, which converts analog video signals output from the infrared cameras 2R and 2L to digital data and stores it into an image memory, and an interface circuit, which accesses (reads and writes) the image data stored into the image memory, to perform various arithmetic processes for the image in front of the vehicle stored into the image memory.

The image processing unit 1 has the functions of an object extraction process unit, an object type determination process unit, and a distance calculation process unit in the present invention. By causing the microcomputer to execute the vehicle surroundings monitoring program according to the present invention, the microcomputer functions as the object extraction process unit and the object type determination process unit of the present invention. Furthermore, by causing the microcomputer to function as the object extraction process unit and the object type determination process unit, the microcomputer performs the object extraction step and the object type determination step in the vehicle surroundings monitoring method according to the present invention.

As shown in FIG. 2, the infrared cameras 2R and 2L are mounted on the front part (the part of a front grille in FIG. 2) of the vehicle 10 to capture images in front of the vehicle 10. In this instance, the infrared cameras 2R and 2L are located on the right side and the left side of the center of the vehicle 10 in the vehicle width direction, respectively. These locations are symmetric with respect to the center of the vehicle 10 in the vehicle width direction. The infrared cameras 2R and 2L are fixed to the front part of the vehicle 10 in such a way that the optical axes of the infrared cameras 2R and 2L are extending parallel to each other in the anteroposterior direction of the vehicle 10 and that the optical axes are at the same height from the road surface. The infrared cameras 2R and 2L have sensitivities in the far-infrared region. These infrared cameras 2R and 2L each have a characteristic that the higher the temperature of a material body captured by the infrared camera is, the higher the level of the output video signal is (the luminance of the video signal is higher).

In this embodiment, the display 7 includes a head up display 7a (hereinafter, referred to as the HUD 7a) which displays image information on the front window of the vehicle 10. The display 7 can include a display integrally mounted on a meter which displays the running condition such as a vehicle speed of the vehicle 10 or a display provided in an in-vehicle navigation system, instead of the HUD 7a or together with the HUD 7a.

Figure 3:
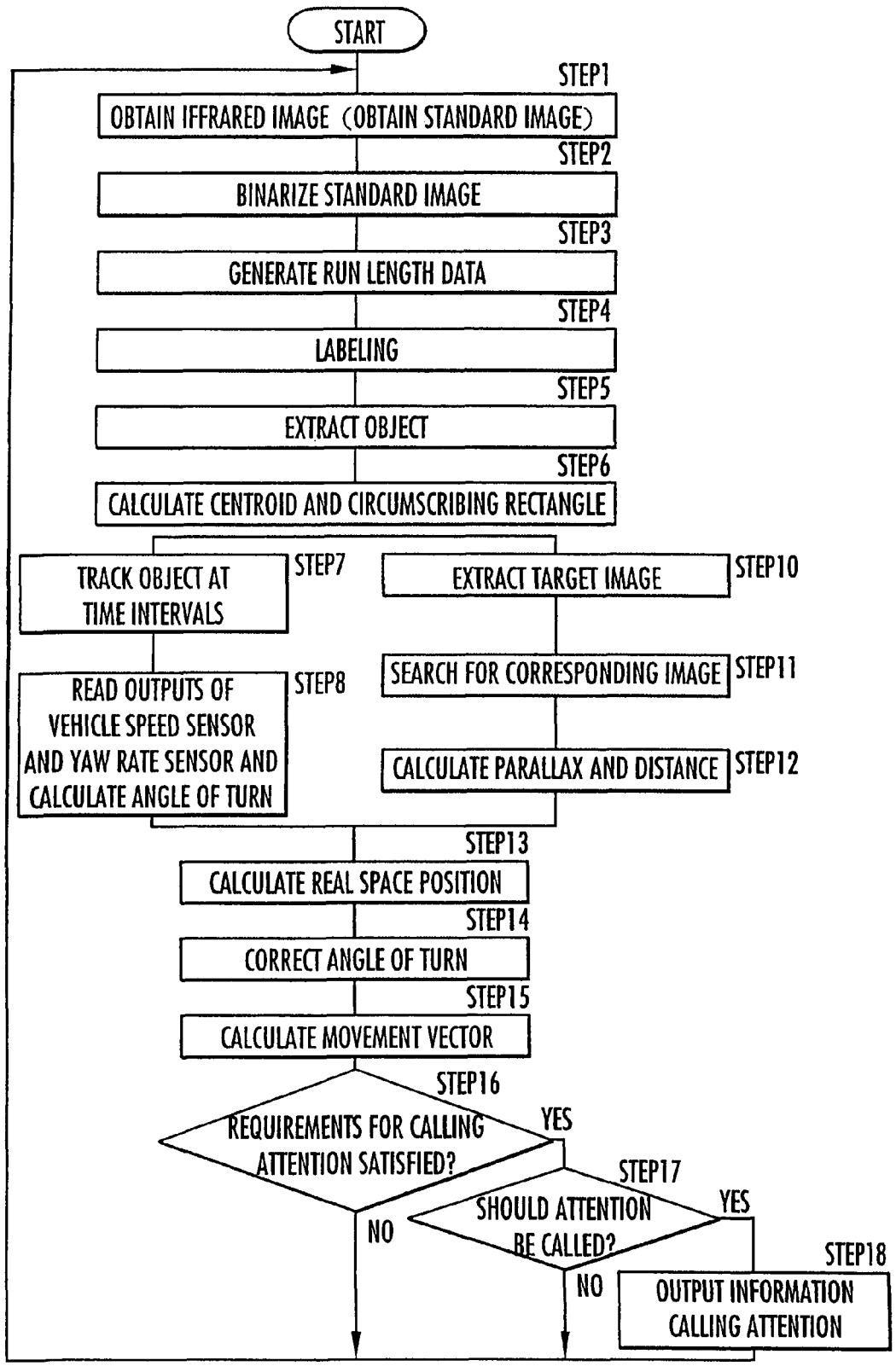
FIG. 3 is a flowchart showing the processing of the image processing unit provided in the vehicle surroundings monitoring apparatus shown in FIG. 1.

Subsequently, the overall operation of the vehicle surroundings monitoring apparatus of this embodiment will be described with reference to the flowchart shown in FIG. 3. Many of the processes in the flowchart shown in FIG. 3 are the same as, for example, those in FIG. 3 disclosed in Japanese Patent Laid-Open No. 2001-6096 by the present applicant, and therefore detailed description of the same processes is omitted in this specification.

First, the image processing unit 1 obtains infrared images captured by the infrared cameras 2R and 2L (step 1). The captured infrared images are grayscale images obtained by A/D-converting the infrared images which are output signals from the infrared cameras 2R and 2L and they are stored into the image memory. Hereinafter, the image obtained by the infrared camera 2R and the image obtained by the infrared camera 2L are referred to as the right image and the left image, respectively, and particularly the right image is referred to as the standard image. While the standard image is the right image in this embodiment, it can be the left image.

Subsequently, the image processing unit 1 binarizes the standard image (right image) (step 2). The binarization is a process of comparing a luminance value of each pixel of the standard image with a predetermined luminance threshold value and setting a value of "1" (white) for an area having a high luminance value equal to or higher than the predetermined luminance threshold value (relatively bright area) and setting a value of "0" (black) for an area having a low luminance value lower than the luminance threshold value (relatively dark area) for the standard image. Hereinafter, the image (black and white image) obtained by the binarization will be referred to as the binary image. The area set to "1" in the binary image is referred to as the high-luminance area. The binary image is stored into the image memory separately from the grayscale image (the right image and the left image).

Subsequently, the image processing unit 1 performs the processing of steps 3 to 5 for the binary image and extracts an object (more accurately, an image area corresponding to the object) from the binary image. In other words, the image processing unit 1 classifies the pixels constituting the high-luminance area of the binary image into lines each having a width of one pixel in the vertical direction (y direction) of the standard image and extending in the horizontal direction (x direction) thereof and converts each line to run length data including the coordinates of the position (the two-dimensional position in the standard image) and the length (the number of pixels) (step 3). Thereafter, the image processing unit 1 appends a label (identifier) to each of the line groups overlapping in the vertical direction of the standard image among the lines represented by the run length data (step 4) and extracts each of the line groups as an object (step 5).

The object extracted by the processing of steps 3 to 5 includes not only a human being (pedestrian) but an artificial structure such as another vehicle. In addition, a plurality of local areas of an identical material body may be extracted as an object.

Subsequently, the image processing unit 1 calculates the centroid position (the position in the standard image), the area, and the aspect ratio of a circumscribing rectangle of each object extracted as described above (step 6). The area is calculated by adding up the lengths of the run length data for the same object. The coordinates of the centroid is calculated as the x coordinate of the line that bisects the area in the x direction and the y coordinate of the line that bisects it in the y direction. The aspect ratio is calculated as that of the rectangle circumscribing the run length data lines. The centroid position of the circumscribing rectangle can be substituted for the position of the centroid G.

Subsequently, the image processing unit 1 tracks the object extracted in step 5 at time intervals, that is, recognizes identical objects for each arithmetic processing period of the image processing unit 1 (step 7). In this process, assuming that an object A is extracted in the process of step 5 at time (discrete time) k in a certain arithmetic processing period and an object B is extracted in the process of step 5 at time k+1 in the next arithmetic processing period, the identity between the objects A and B is determined. The identity can be determined, for example, based on the shape and size of the objects A and B in the binary image and a correlation of the luminance distributions of the objects A and B in the standard image (grayscale image). If the objects A and B are determined to be identical to each other, the label (the label appended in step 4) of the object B extracted at time k+1 is changed to the same label as the object A.

Subsequently, the image processing unit 1 reads the outputs of the vehicle speed sensor 4 and the yaw rate sensor 3 (the detected value of the vehicle speed and that of the yaw rate) (step 8). In step 8, the angle of turn (azimuth) of the vehicle 10 is also calculated by integrating the detected value of the yaw rate having been read.

On the other hand, the image processing unit 1 performs the process of step 10 in parallel with the processes of steps 7 and 8. The processes of steps 10 to 12 are performed to calculate a distance of each object extracted in step 5 from the vehicle 10. Briefly describing the processes, the image processing unit 1 first extracts an area corresponding to each object (for example, the area of the rectangle circumscribing the object) as a target image R1 in the standard image (step 10).

Thereafter, the image processing unit 1 sets a search area R2 in the left image, as an area for use in searching for the same object as one included in the target image R1 of the right image. Furthermore, the image processing unit 1 extracts an area having the highest correlation with the target image R1 in the search area R2, as a corresponding image R3 which is the image corresponding to the target image R1 (the image equivalent to the target image R1) (step 11). In this instance, the image processing unit 1 extracts the area, having a luminance distribution most closely matching the luminance distribution of the target image R1 in the right image, as the corresponding image R3 from the search area R2 of the left image. The process of step 11 is performed not using binary images, but using grayscale images.

Subsequently, the image processing unit 1 calculates the number of pixels of a difference between the horizontal position (the position in the x direction) of the centroid of the target image R1 in the right image and the horizontal position (the position in the x direction) of the centroid of the corresponding image R3 in the left image as a parallax Δd. The image processing unit 1 calculates a distance z (the distance in the anteroposterior direction of the vehicle 10) of the object from the vehicle 10 by using the parallax Δd (step 12). The distance z is calculated by the following equation (1):

$$z = (f \times D)/(\Delta d \times p) \quad (1)$$

where f is the focal distance of the infrared cameras 2R and 2L, D is the base length (the distance between the optical axes) of the infrared cameras 2R and 2L, and p is a pixel pitch (the length of one pixel).

The above is the outline of the processes of steps 10 to 12. The processes of steps 10 to 12 are performed for each object extracted in step 5.

After completion of the processes of steps 8 and 12, the image processing unit 1 subsequently calculates a real space position which is the position in the real space of each object (the relative position to the vehicle 10) (step 13). The real space position is the position (X, Y, Z) in the real space coordinate system (XYZ coordinate system) set with the midpoint between the mounting positions of the infrared cameras 2R and 2L as the origin, as shown in FIG. 2. The X direction and Y direction of the real space coordinate system are the vehicle width direction and the vertical direction of the vehicle 10, respectively. The X direction and the Y direction are the same as the x direction (lateral direction) and the y direction (perpendicular direction) of the right image and the left image, respectively. The Z direction of the real space coordinate system is the anteroposterior direction of the vehicle 10. The real space position (X, Y, Z) of the object is calculated by the following equations (2), (3), and (4), respectively:

$$X = x \times z \times p/f \quad (2)$$

$$Y = y \times z \times p/f \quad (3)$$

$$Z = z \quad (4)$$

where x and y are the x coordinate and y coordinate of the object in the standard image.

Subsequently, the image processing unit 1 compensates for the effect of the change in the angle of turn of the vehicle 10 and corrects the position X in the X direction of the real space position (X, Y, Z) of the object in order to increase the accuracy of the real space position of the object based on the value calculated by the above equation (2) according to the time-series data of the angle of turn calculated in step 8 (step 14). Thereby, the real space position of the object is finally obtained. In the following description, the term "real space position of the object" means the real space position of the object corrected as described above.

Subsequently, the image processing unit 1 determines a movement vector of the object relative to the vehicle 10 (step 15). Specifically, it determines a straight line approximate to time series data over a predetermined period (a period from the current time to a time point a predetermined time period earlier) of the real space position of an identical object and then determines a vector from the position (point) of the object on the straight line at the time point the predetermined time period earlier toward the position (point) of the object on the straight line at the current time as the movement vector of the object. This movement vector is proportional to a relative speed vector of the object with respect to the vehicle 10.

Next, in step 15, after determining the relative movement vector, the image processing unit 1 performs a calling attention determination process for determining the possibility of contact between the vehicle 10 and the detected object (step 16). The calling attention determination process will be described later in detail.

The image processing unit 1 restarts the processes from step 1 if it determines that no object satisfies the requirements for calling attention (there is no object fulfilling the requirements for calling attention) in the calling attention determination process in step 16 (if the determination result is NO in step 16). If it determines that any of the objects satisfies the requirements for calling attention in step 16 (if the determination result is YES in step 16), the image processing unit 1 proceeds to step 17 to perform the calling attention output determination process for determining whether to actually call attention to the object satisfying the requirements for calling attention (step 17). In this calling attention output determination process, it is checked that the driver is operating the brake of the vehicle 10 on the basis of an output of the brake sensor 5 and it is determined that the attention should not be called if the deceleration (positive in the decelerating direction of the vehicle speed) of the vehicle 10 is larger than a predetermined threshold value (>0). Unless the driver is operating the brake or if the deceleration of the vehicle 10 is equal to or lower than the predetermined threshold value though the driver is operating the brake, the image processing unit 1 determines that the attention should be called.

If the image processing unit 1 determines that the attention should be called (if the determination result is YES in step 17), it outputs information calling attention (step 18). Specifically, information calling attention is output by voice through the loudspeaker 6 and the image of the object satisfying the requirements for calling attention is displayed in a highlighted manner in the standard image on the display 7. Thereby, the driver's attention to the object is called. It is also possible to use only one of the loudspeaker 6 and the display 7 to call the driver's attention.

If it is determined that the attention should not be called in step 17 (if it is determined that the attention should not be called for any object), the determination result is NO in step 17. If this is the case, the image processing unit 1 directly restarts the processes from the step 1.

The above is the overall operation of the vehicle surroundings monitoring apparatus according to this embodiment. The facility which performs the processes of steps 1 to 6 by means of the image processing unit 1 corresponds to the object extraction process unit of the present invention, and the facility which performs the process of step 12 corresponds to the distance calculation process unit of the present invention. The processes of steps 1 to 6 correspond to the object extraction step in the vehicle surroundings monitoring method according to the present invention.

Subsequently, the calling attention determination process in step 16 of the flowchart shown in FIG. 3 will be described in more detail with reference to the flowchart shown in FIG. 4. Many of the processes in the flowchart shown in FIG. 4 are the same as, for example, those in FIG. 4 disclosed in Japanese Patent Laid-Open No. 2001-6096 by the present applicant, and therefore detailed description of the same processes is omitted in this specification.

Figure 4:
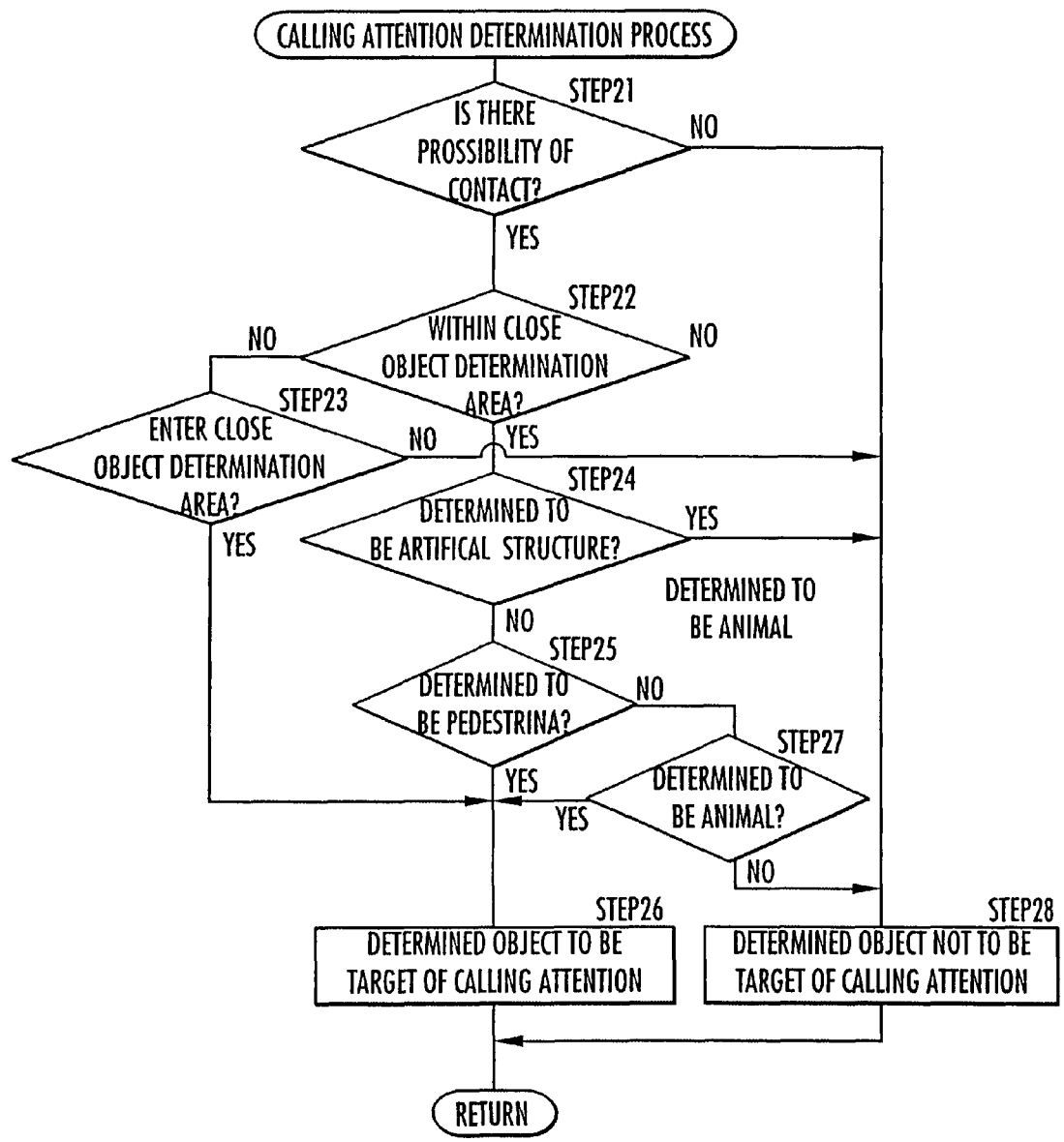
FIG. 4 is a flowchart showing the processing of the image processing unit provided in the vehicle surroundings monitoring apparatus shown in FIG. 1.

FIG. 4 is a flowchart showing the calling attention determination process operation of this embodiment. The calling attention determination process is performed to determine the possibility of contact between the vehicle 10 and a detected object through a contact determination process, a determination process for determining whether the object is within a close object determination area, an approaching object contact determination process, a pedestrian determination process, an artificial structure determination process, and an object type determination process related to the present invention described below.

First, the image processing unit 1 performs a contact determination process (step 21). The contact determination process is performed by calculating a relative speed Vs of the object with respect to the vehicle 10 in the Z direction based on the distance by which the object comes close to the vehicle 10 for a predetermined time period and determining whether there is a possibility of contact between them within a time allowed T (for example, two to five seconds) assuming that they are moving with the relative speed Vs maintained. Specifically, if the distance between the vehicle 10 and the object is equal to or less than a value obtained by multiplying the relative speed Vs by the time allowed T, the image processing unit 1 determines there is the possibility of contact between them.

Next, in step 21, if there is the possibility of contact between the vehicle 10 and the object within the time allowed T (if the determination result is YES in step 21), the control proceeds to step 22, where the image processing unit 1 determines whether the object exists within the close object determination area so as to further increase the reliability of the determination (step 22). The determination process for determining whether the object is within the close object determination area is performed by determining whether the object exists within an area corresponding to a range having a width of the vehicle 10 plus allowances (for example, of the order of 50 to 100 cm) on both sides of the vehicle 10, in other words, within the close object determination area at extremely high risk of contact with the vehicle 10 if the object continues to exist there, in an area that can be monitored by the infrared cameras 2R and 2L.

Furthermore, in step 22, unless the object exists within the close object determination area (if the determination result is NO in step 22), the image processing unit 1 performs the approaching object contact determination process for determining whether there is a possibility that the object enters the close object determination area and comes in contact with the vehicle 10 (step 23). An area having X coordinates with larger absolute values than those of X coordinates of the above close object determination area (area laterally outward of the close object determination area) in the imaging area of the camera is referred to as the approaching object determination area. The approaching object contact determination process is performed by determining whether the object in this area enters the close object determination area and comes in contact with the vehicle 10 by moving. Specifically, if the movement vector (see step 15) of the object exists in the close object determination area is extended toward the vehicle 10, the image processing unit 1 determines that the object is likely to come in contact with the vehicle 10.

On the other hand, if the object exists within the close object determination area in step 22 (if the determination result is YES in step 22), the image processing unit 1 performs an artificial structure determination process for determining whether the object is an artificial structure (step 24). The artificial structure determination process is performed by determining an object to be an artificial structure and excluding the object from the targets of calling attention if a feature impossible for a pedestrian is detected in the image area of the object, for example, as described in the following conditions in (a) to (d):

The image of the object includes a portion representing a linear edge;
  (b) The image of the object has a right angle;
  (c) The image of the object includes the same shapes;
  (d) The shape of the image of the object matches a previously registered pattern of an artificial structure.

Next in step 24, if the object is determined not to be an artificial structure (if the determination result is NO in step 24), the image processing unit 1 performs a pedestrian determination process for determining whether there is a possibility that the object is a pedestrian in order to increase the reliability of the determination (step 25). The pedestrian determination process is performed by determining whether the object is a pedestrian based on features such as the shape, size, luminance variance or the like of the image area of the object in the grayscale image.

Furthermore, if the object is likely to enter the close object determination area and to come in contact with the vehicle 10 in step 23 (if the determination result is YES in step 23) and if the object is likely to be a pedestrian in step 25 (if the determination result is YES in step 25), the image processing unit 1 determines the detected object to be a target of calling attention (step 26) and considers the determination result in step 16 shown in FIG. 3 as YES. The control then proceeds to step 17, where the image processing unit 1 performs the calling attention output determination process (step 17).

On the other hand, if the object is determined not to be a pedestrian in the above step 25 (if the determination result is NO in step 25), the object type determination process related to the present invention is performed (step 27), though the details will be described later. In the object type determination process, it is determined whether there is an animal other than a human being among the objects. If an object is determined to be an animal other than a human being as a result of the object type determination process (if the determination result is YES in step 27), the image processing unit 1 determines the detected object to be a target of calling attention (step 26) and considers the determination result in step 16 shown in FIG. 3 as YES. The control then proceeds to step 17, where the image processing unit 1 performs the calling attention output determination process (step 17).

On the other hand, if there is no possibility of contact between the vehicle 10 and the object within the time allowed T in the above step 21 (if the determination result is NO in step 21), if the object is not likely to enter the close object determination area and to come in contact with the vehicle 10 in step 23 (if the determination result is NO in step 23), if the object is determined to be an artificial structure in step 24 (if the determination result is YES in step 24), or if the object is determined not to be an animal other than a human being in step 27 (if the determination result is NO in step 27), the image processing unit 1 determines the detected object not to be a target of calling attention (step 28) and considers the determination result in step 16 as NO. The control then returns to step 1, where the image processing unit 1 repeats the detection and calling attention operation for an object such as a pedestrian or the like.

The above is the description of the calling attention determination process in step 16 of the flowchart shown in FIG. 3.

Figure 5:
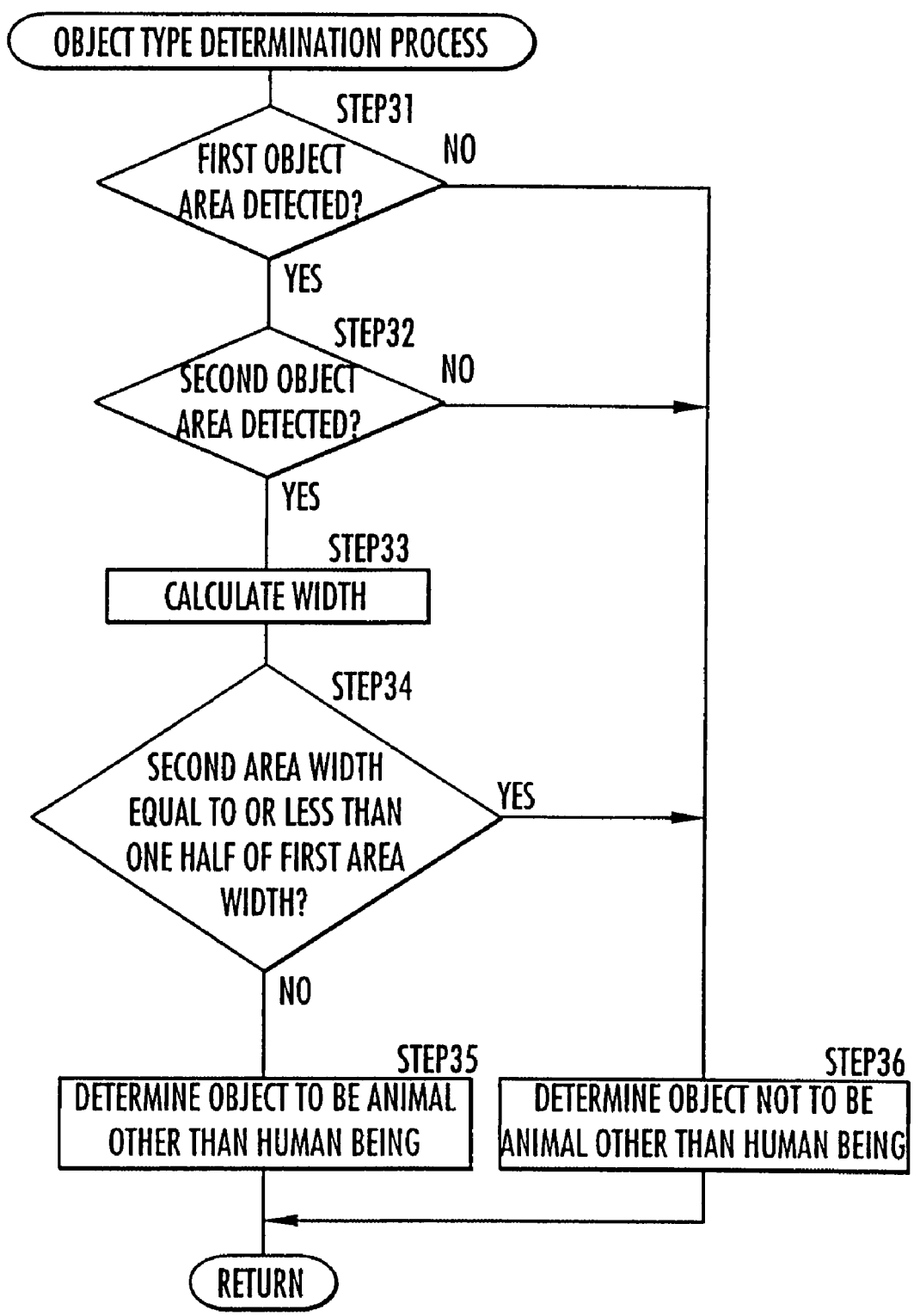
FIG. 5 is a flowchart showing an object type determination process in the embodiment.

Subsequently, the object type determination process of step 27 related to the present invention will be described with reference to the flowchart shown in FIG. 5 together with FIG. 6 and FIG. 7.

First, the image processing unit 1 detects an inverse triangular shape having a predetermined size depending on the distance between the object and the vehicle 10 as a first object area by a known shape matching method from a binary image (see step 2) of each object determined not to be a pedestrian in the above step 25 (step 31). Note here that the inverse triangular shape having the predetermined size corresponds to the head of a large animal such as a deer, cow, horse, or camel and that the predetermined size is set as the size of the inverse triangular shape according to a distance between the object and the vehicle 10. Therefore, even if the image area of the object includes an inverse triangular shape, a road sign not having an inverse triangular shape corresponding to the head of a large animal or a signboard not having a predetermined size is not detected as the first object area.

Figure 6A:
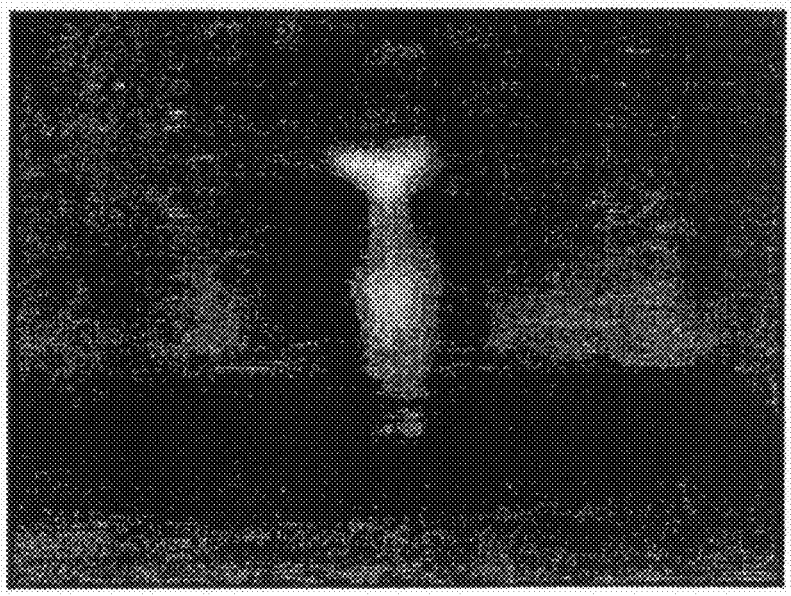
FIG. 6 is a diagram illustratively showing a captured image in the embodiment.
Figure 6B:
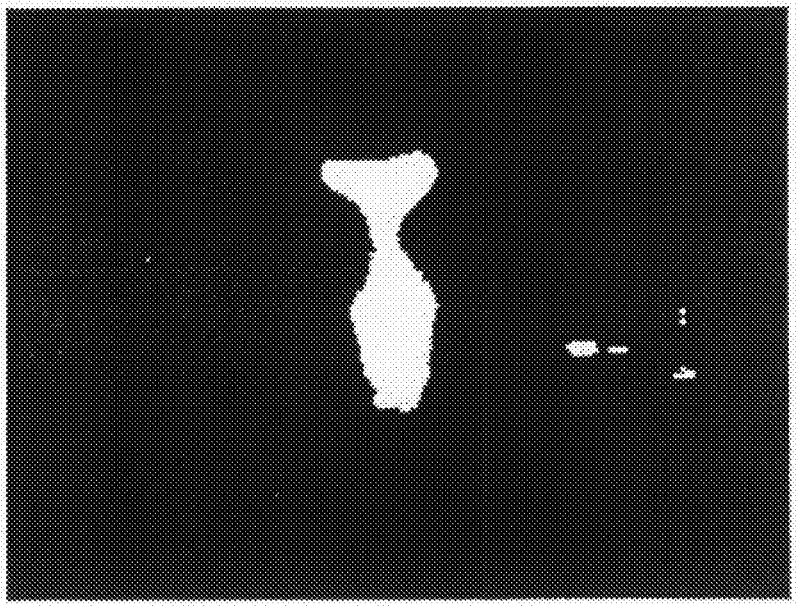

For example, if the image of a deer as shown in FIG. 6(*a*) is obtained as the captured infrared image, the binary image of the captured infrared image has the external shape shown in FIG. 6(*b*). Thereafter, an inverse triangular shape corresponding to the head of the animal is detected as a first object area P1 as shown in FIG. 7 from the external shape of the object in the binary image by using the shape matching method.

Subsequently, if the first object area is detected in step 31 (if the determination result is YES in step 31), the control proceeds to step 32, where the image processing unit 1 extracts a plurality of second object area candidates satisfying a condition of being located below the first object area and within a predetermined range from the first object area. The image processing unit 1 then detects a second object area candidate whose real space position is located within a predetermined distance from the real space position of the first object area as a second object area corresponding to the body among the plurality of second object area candidates (step 32). Note here that the predetermined range is set assuming a range in the image where the body can be generally located relative to the head of a large animal such as a deer, cow, horse, camel or the like. When the animal as an object is viewed from the front, the body is located substantially just below the head. On the other hand, when it is viewed from the back, the body is not located just below the head, but on this side (on the side near the vehicle 10). Therefore, the predetermined distance is set assuming a distance that is equivalent to a distance from the head position to the farthest position of the body in the real space.

For example, in the instance shown in FIG. 7, an image area P2, which is located below the first object area P1 and within the predetermined range from the first object area P1 is detected as a second object area candidate, and if the real space position of the image area P2 is within the predetermined distance from the real space position of the first object area P1, the image area P2 is detected as a second object area.

Subsequently, if the second object area is detected in step 32 (if the determination result is YES in step 32), the control proceeds to step 33, where the image processing unit 1 calculates a first area width, which is the horizontal width of the first object area of the object, and a second area width, which is the width measured at the position where the second object area has the maximum horizontal width (step 33).

Figure 7:
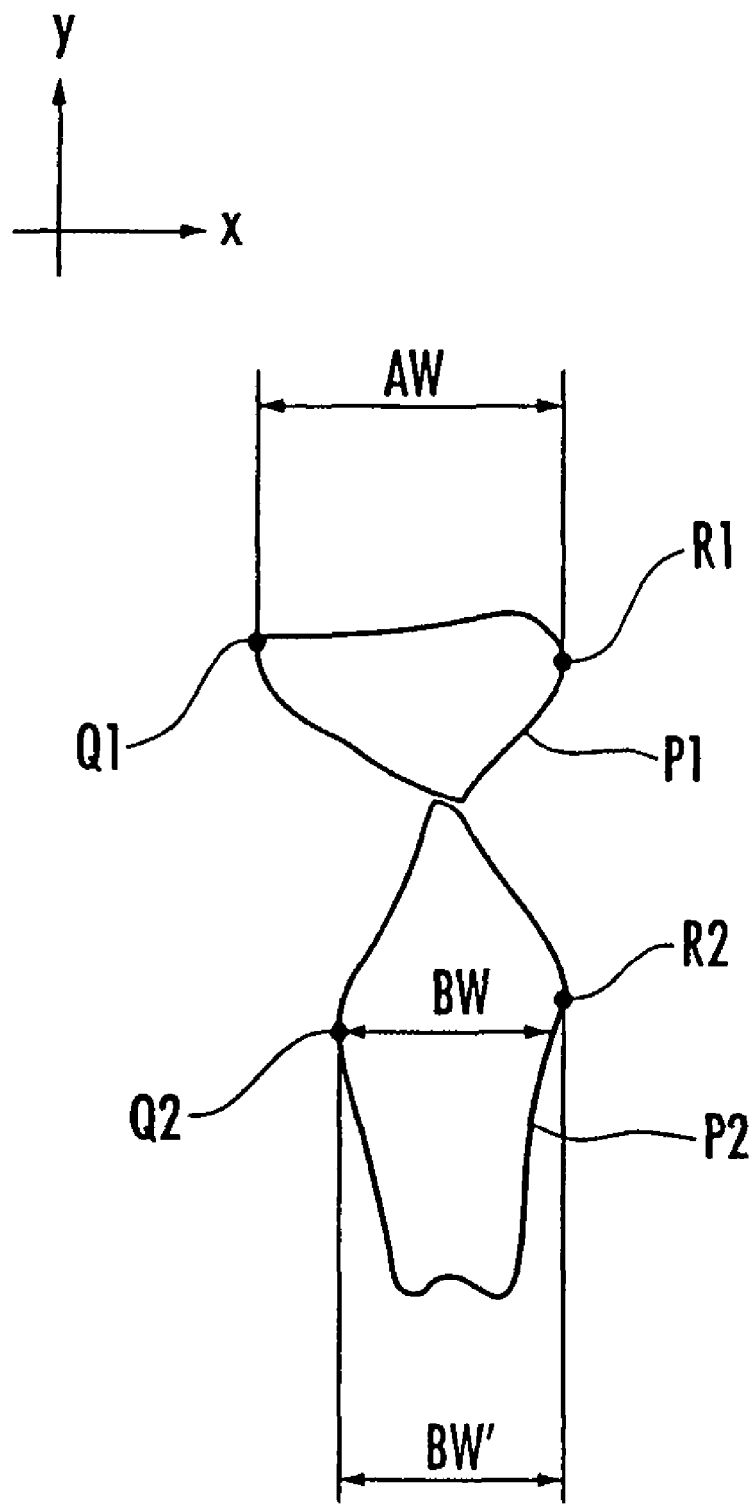
FIG. 7 is a diagram for explaining the processing of the image processing unit.

For example, in the instance shown in FIG. 7, the image processing unit 1 calculates a first area width AW, which is the horizontal (x-axis direction in FIG. 7) width of the first object area P1 in the binary image, and a second area width BW, which is the maximum horizontal width of the second object area P2. While the first area width is calculated as the horizontal width AW of the first object area P1 here, it is also possible to calculate the length of a side (the length between Q1 and R1 in FIG. 7) facing the apex angle located at the lowest position of the inverse triangular shape by using the coordinates in the image and to consider the length as the first area width. In addition, while the second area width is the width BW measured at the position where the second object area P2 has the maximum horizontal width, it can be the length BW' between both end edges Q2 and R2 of the second object area P2 in the horizontal direction.

Subsequently, after the first area width and the second area width are calculated in step 33, the control proceeds to step 34, where the image processing unit 1 determines whether the second area width is equal to or less than one half of the first area width (step 34).

For example, in the instance shown in FIG. 7, it is determined whether the value of BW/AW is equal to or less than one half of the first area width, where AW is the first area width and BW is the second area width in the binary image. The reason why the determination condition is the value of BW/AW equal to or less than one half is that the width of the body supporting the head is thought to be greater than at least one half of the width of the head. In other words, if the second area width BW as the width of the body is equal to or less than the first area width AW as the width of the head, the relationship is impossible as one between the head and the body supporting the head of the animal. Therefore, an artificial structure such as a road sign whose BW/AW value is equal to or less than one half is generally determined not to be an animal other than a human being.

If the second area width is greater than one half of the first area width in step 34 (if the determination result is NO in step 34), the image processing unit 1 determines the object to be an animal other than a human being (step 35) and terminates the object type determination process.

On the other hand, if the first object area is not detected in the binary image in the above step 31 (if the determination result is NO in step 31), if the second object area is not detected in the lower position of the first object area in step 32 (if the determination result is NO in step 32), if the second area width is equal to or less than one half of the first area width in step 34 (if the determination result is YES in step 34), the image processing unit 1 determines that the object is not an animal other than a human being (step 36) and terminates the object type determination process.

The details of the object type determination process of the present invention have been described hereinabove. The facility which performs the processes of steps 31 to 36 by means of the image processing unit 1 corresponds to the object type determination process unit according to the present invention. In addition, the processes of steps 31 to 36 correspond to the object type determination step in the vehicle surroundings monitoring method according to the present invention.

In the object type determination process in step 27 in this embodiment, it is determined by using the binary image whether the object is an animal other than a human being under the conditions:

The object includes the first object area having the inverse triangular shape and the predetermined size corresponding to the head (step 31);

The object includes the second object area corresponding to the body (step 32); and The object has the second area width which is greater than one half of the first area width (step 34).

The determination, however, can also be performed under a part of the above conditions (1) to (3). For example, it can be performed only under the above conditions (1) and (2). In addition, the determination can be performed with the above condition (1) changed as follows: the object includes the first object area having the inverse triangular shape ("the predetermined size" is not included in the condition).

Furthermore, while it is determined whether the object type is an animal other than a human being in the object type determination process in step 27 in this embodiment, it is also possible to determine whether any other type can be determined. For example, it is also possible to determine whether the object type is a large animal or small animal according to the size of the image area of the object. Alternatively, it is possible to determine whether the object type is a deer, cow, horse, or the like among the large animals by further identifying the shape detected from the image area of the object.

Furthermore, while the processes of steps 31 to 37 are performed by using the binary image in the object type determination process in step 27 in this embodiment, the object type determination process is not limited thereto. For example, the processes of steps 31 to 37 can be performed by using the standard image instead of the binary image so as to use a luminance variance of the standard image.

Still further, while the inverse triangular shape having the predetermined size depending on the distance between the object and the vehicle 10 is detected as the first object area from the external shape of the object in the binary image by using the known shape matching method in the object type determination process in step 27 (step 31) in this embodiment, the object type determination process is not limited thereto. For example, the binary image of the object is divided between areas of decrease and increase in change of the run length of the binary image of the object. It is then possible to detect an area having a predetermined size where the run length decreases in the downward direction in the divided areas, as an inverse triangular shape.

Furthermore, while the predetermined calling attention is performed based on the processing result of the image processing unit 1 in this embodiment, a vehicle behavior can also be controlled based on the processing result.

Furthermore, while the two infrared cameras 2R and 2L have been provided in this embodiment, the vehicle 10 can also be equipped with one infrared camera 2R or 2L with radar or the like mounted thereon to detect the distance from the object.

What is claimed is:

1. A vehicle surroundings monitoring apparatus which monitors the surroundings of a vehicle by using an image captured by a camera mounted on the vehicle, comprising:
    an object extraction process unit which extracts an image area of an object from the image captured by the camera;
    a pedestrian determination process unit which determines whether or not the object is a pedestrian based on the image area of the object extracted by the object extraction process unit; and
    an object type determination process unit which determines an object type when the pedestrian determination process unit determines that the object is not a pedestrian and when the image area of the object includes a first object area of an inverse triangular shape and a second object area located below the first object area and within a predetermined range from the first object area, a first area width is given as a length of a side facing an apex angle located at a lowest position of the inverse triangular shape or a maximum value of a horizontal width of the inverse triangular shape, and a second area width is given as a maximum value of a horizontal width of the second object area, wherein the object type determination process unit determines the object type to be an animal other than a human being in a case where the second area width is greater than one half of the first area width and determines the object type to be an artificial structure in a case where the second area width is not greater than one half of the first area width.

2. A vehicle surroundings monitoring apparatus according to claim 1, wherein the object type determination process unit determines that the object type is an animal other than a human being also in a case where the image area of the object extracted by the object extraction process unit includes the first object area of the inverse triangular shape and the second object area located below the first object area and within the predetermined range from the first object area.

3. A vehicle surroundings monitoring apparatus according to claim 1, wherein the first object area has a predetermined size.

4. A vehicle surroundings monitoring apparatus according to claim 1, further comprising a distance calculation process unit which calculates a distance of a real space position corresponding to the image area included in the captured image from the vehicle, wherein the object type determination process unit detects an area of an inverse triangular shape having a predetermined size depending on a distance of a real space position from the vehicle as the first object area.

5. A vehicle surroundings monitoring apparatus according to claim 4, wherein the object type determination process unit determines that the object type is an animal other than a human being under a condition that a real space position corresponding to the second object area is positioned within a predetermined distance from a real space position corresponding to the first object area.

6. A vehicle equipped with the vehicle surroundings monitoring apparatus according to claim 1.

7. A vehicle surroundings monitoring apparatus according to claim 1, further comprising a distance calculation process unit which calculates a distance of a real space position corresponding to the image area included in the captured image from the vehicle, wherein the object type determination process unit determines that the object type is an animal other than a human being under a condition that a real space position corresponding to the second object area is positioned within a predetermined distance from a real space position corresponding to the first object area.

8. A vehicle surroundings monitoring apparatus which monitors the surroundings of a vehicle by using a computer which is provided in the apparatus and includes an interface circuit for use in accessing an image captured by a camera mounted on the vehicle, the computer performing:

an object extraction process for extracting an image area of an object from the image captured by the camera;

a pedestrian determination process for determining whether or not the object is a pedestrian based on the image area of the object extracted by the object extraction process unit; and an object type determination process for determining an object type when the pedestrian determination process determines that the object is not a pedestrian and when the image area of the object includes a first object area of an inverse triangular shape and a second object area located below the first object area and within a predetermined range from the first object area, a first area width is given as a length of a side facing an apex angle located at a lowest position of the inverse triangular shape or a maximum value of a horizontal width of the inverse triangular shape, and a second area width is given as a maximum value of a horizontal width of the second object area, wherein the object type determination process determines the object type to be an animal other than a human being in a case where the second area width is greater than one half of the first area width and determines the object type to be an artificial structure in a case where the second area width is not greater than one half of the first area width.

9. A vehicle equipped with the vehicle surroundings monitoring apparatus according to claim 8.

10. A vehicle surroundings monitoring apparatus according to claim 8, wherein the computer further performs a distance calculation process which calculates a distance of a real space position corresponding to the image area included in the captured image from the vehicle, wherein the object type determination process detects an area of an inverse triangular shape having a predetermined size depending on a distance of a real space position from the vehicle as the first object area.

11. A vehicle surroundings monitoring apparatus according to claim 10, wherein the object type determination process determines that the object type is an animal other than a human being under a condition that a real space position corresponding to the second object area is positioned within a predetermined distance from a real space position corresponding to the first object area.

12. A vehicle surroundings monitoring apparatus according to claim 8, wherein the computer further performs a distance calculation process which calculates a distance of a real space position corresponding to the image area included in the captured image from the vehicle, wherein the object type determination process determines that the object type is an animal other than a human being under a condition that a real space position corresponding to the second object area is positioned within a predetermined distance from a real space position corresponding to the first object area.

13. A vehicle surroundings monitoring method of monitoring the surroundings of a vehicle by using an in-vehicle computer including a processing unit which accesses data of an image captured by a camera mounted on the vehicle, the method comprising:

an object extraction step of causing the computer to extract the image area of an object from the image captured by the camera;

a pedestrian determination step of causing the computer to determine whether or not the object is a pedestrian based on the image area of the object extracted in the object extraction step; and an object type determination step of causing the computer to determine an object type when the pedestrian determination step determines that the object is not a pedestrian and when the image area of the object includes a first object area of an inverse triangular shape and a second object area located below the first object area and within a predetermined range from the first object area, a first area width is given as a length of a side facing an apex angle located at a lowest position of the inverse triangular shape or a maximum value of a horizontal width of the inverse triangular shape, and a second area width is given as a maximum value of a horizontal width of the second object area, wherein the object type determination step causes the computer to determine the object type to be an animal other than a human being in a case where the second area width is greater than one half of the first area width and to determine the object type to be an artificial structure in a case where the second area width is not greater than one half of the first area width.

14. A vehicle surroundings monitoring method according to claim 13, comprising a further step of causing the computer to calculate a distance of a real space position corresponding to the image area included in the captured image from the vehicle, wherein the object type determination step detects an area of an inverse triangular shape having a predetermined size depending on a distance of a real space position from the vehicle as the first object area.

15. A vehicle surroundings monitoring method according to claim 14, wherein the object type determination step causes the computer to determine that the object type is an animal other than a human being under a condition that a real space position corresponding to the second object area is positioned within a predetermined distance from a real space position corresponding to the first object area.

16. A vehicle surroundings monitoring method according to claim 13, comprising a further step of causing the computer to calculate a distance of a real space position corresponding to the image area included in the captured image from the vehicle, wherein the object type determination step determines that the object type is an animal other than a human being under a condition that a real space position corresponding to the second object area is positioned within a predetermined distance from a real space position corresponding to the first object area.

\* \* \* \* \*